No. 636,795. Patented Nov. 14, 1899.
A. R. GROTZ.
MOLD FOR PRESSED GLASSWARE AND POTTERY WARE.
(Application filed June 8, 1899.)
(No Model.) 2 Sheets—Sheet 1.
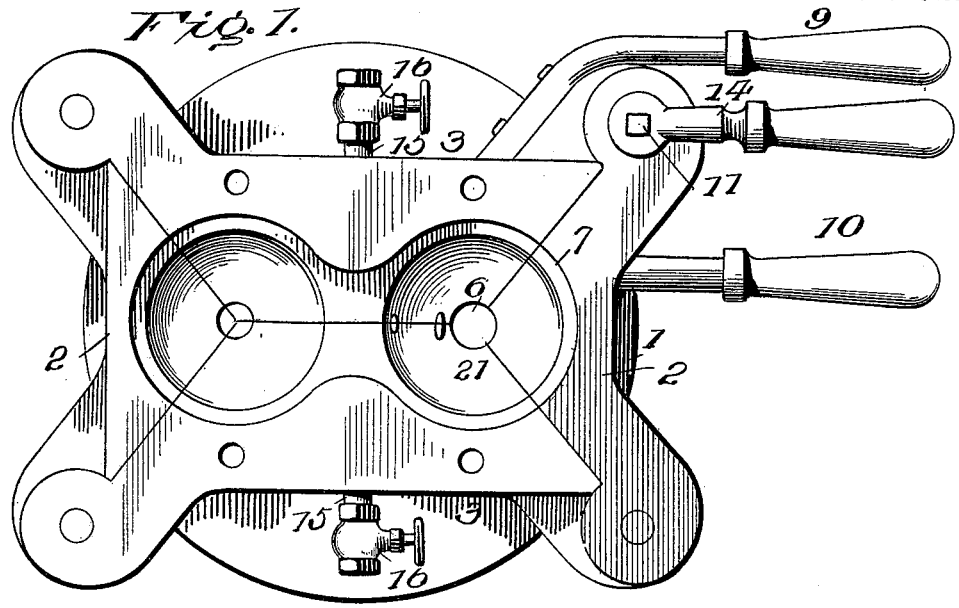
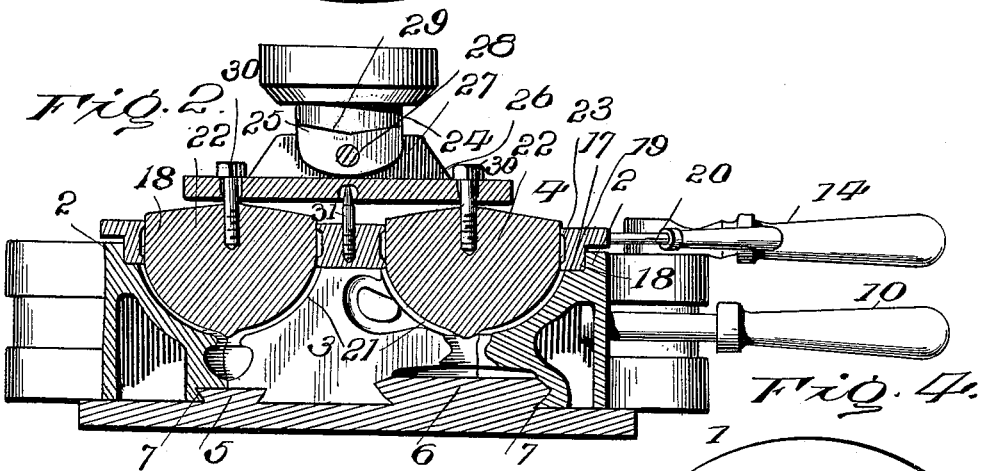
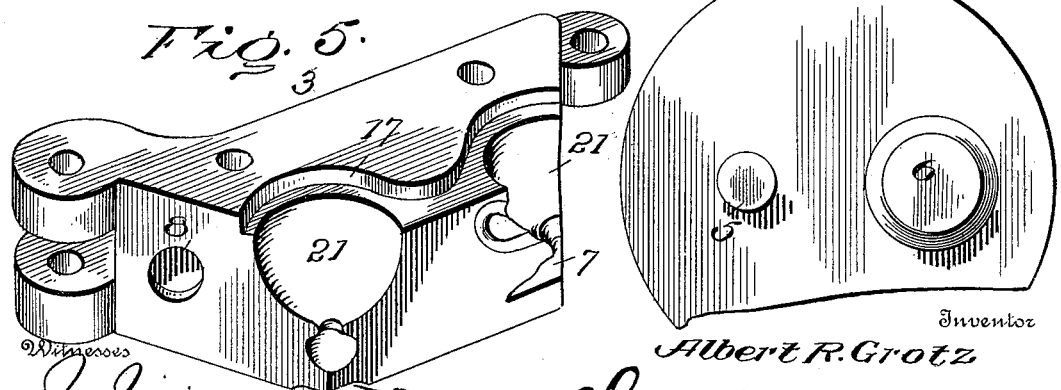
Inventor
Albert R. Grotz No. 636,795. Patented Nov. 14, 1899.
A. R. GROTZ.
MOLD FOR PRESSED GLASSWARE AND POTTERY WARE.
(Application filed June 8, 1899.)
(No Model.) 2 Sheets—Sheet 2.
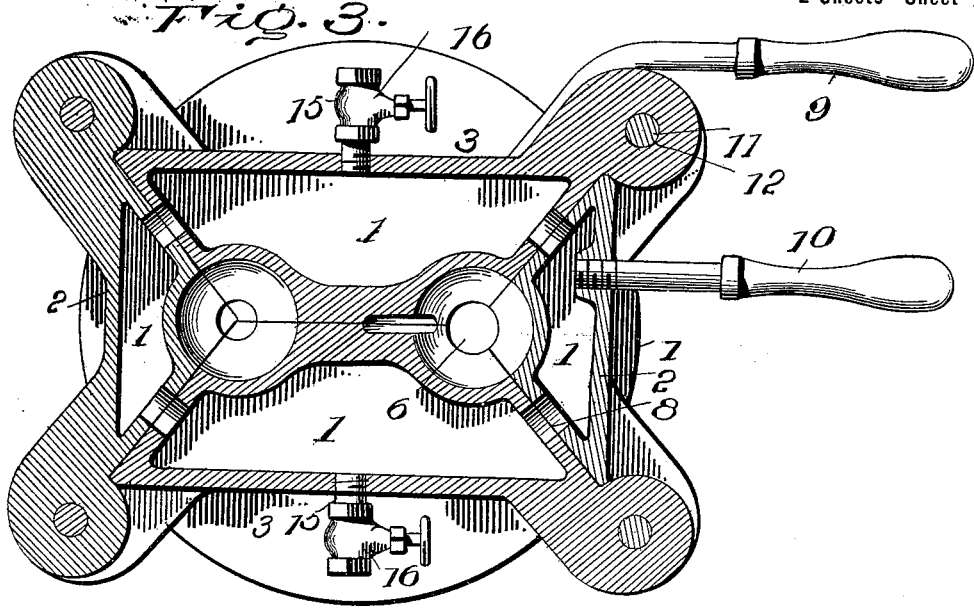
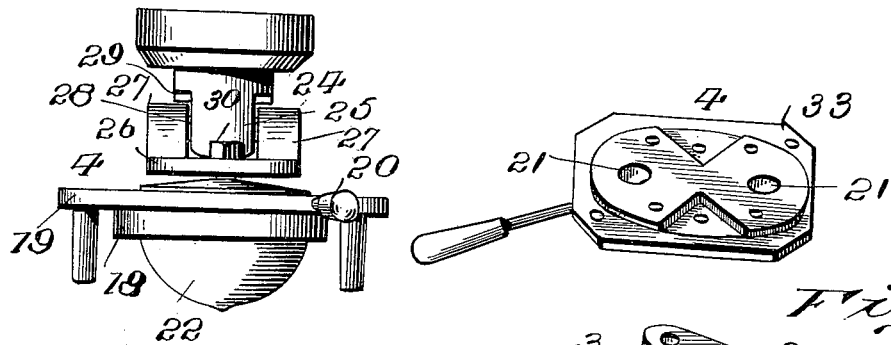
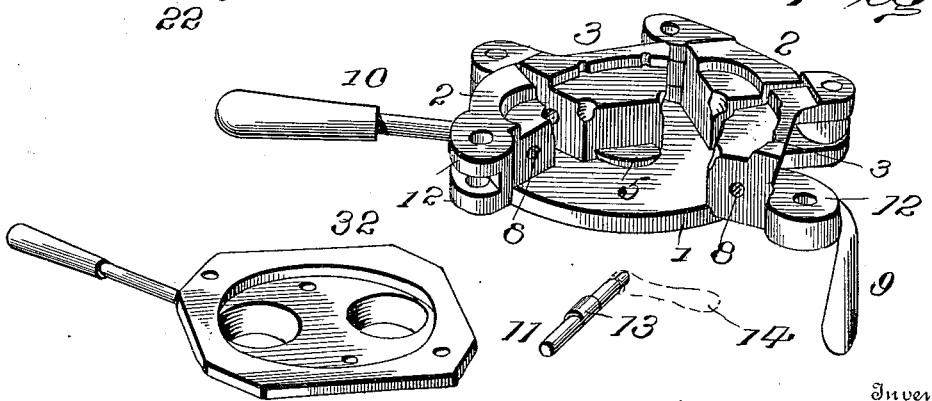
Witnesses
Inventor
Albert R. Grotz
by his Attorney

UNITED STATES PATENT OFFICE.

ALBERT R. GROTZ, OF LAZEARVILLE, WEST VIRGINIA.

MOLD FOR PRESSED GLASSWARE AND POTTERY-WARE.

SPECIFICATION forming part of Letters Patent No. 636,795, dated November 14, 1899.

Application filed June 8, 1899. Serial No. 719,795. (No model.)

*To all whom it may concern:*

Be it known that I, ALBERT R. GROTZ, a citizen of the United States, residing at Lazearville, in the county of Brooke and State of West Virginia, have invented certain new and useful Improvements in Molds for Pressed Glassware and Pottery-Ware; and I do hereby declare the following to be a full, clear, and exact description of the invention, such as will enable others skilled in the art to which it appertains to make and use the same.

This invention relates to molds for pressed glassware, pottery-ware, or plastic compositions, either of the open-and-shut type or the block variety, according to the grade or quality of the articles to be molded and whether the articles are to be seamless or not.

The primary object of the invention is the provision of a mold which will enable two or more articles being pressed at the same time, the plungers being so mounted as to yield and equalize the pressure and insure perfect work even though the material is a little over or a trifle short of the required amount. Without this provision imperfect work would result, as it is practically impossible to supply the cavities of the mold with the exact quantity of material each time, and the article pressed from the material short of the required amount would be incomplete if the plungers were rigidly connected; but by having the plungers loosely connected they can adapt themselves to variations in the quantity of material in each cavity of the mold and distribute the pressure equally upon each.

The improvement consists, essentially, of the novel features, details of construction, and combinations of parts, which will be more particularly outlined in the appended claims.

The invention is applicable to different forms of molds for glassware, pottery-ware, and plastic compositions, and in the practical embodiment thereof it is to be understood that various changes in the form, proportions, and minor details of construction may be resorted to without departing from the spirit or sacrificing any of the advantages of the invention.

In the drawings forming a part of this specification, Figure 1 is a top plan view of a mold constructed in accordance with the invention, the pressing mechanism being omitted. Fig. 2 is a longitudinal section showing the relation of the parts when the plungers have been forced into the mold-cavities to shape the material placed therein. Fig. 3 is a plan section. Fig. 4 is a detail view of the base. Fig. 5 is a detail view in perspective of a side section of the open-and-shut mold. Fig. 6 is an end view of the pressing mechanism. Fig. 7 is a detail view of a block mold, the parts being separated and disposed in a group.

Corresponding and like parts are referred to in the following description and indicated in all the views of the drawings by the same reference characters.

The mold proper comprises a base 1, a sectional body composed of end pieces 2 and side pieces 3, and a combined cap and guide plate 4, the latter being removably fitted to the body of the mold after the sections thereof have been brought into proper relation. The base is provided upon its top side with bosses or projections 5 and 6, which are preferably of circular outline and have their edges undercut so as to interlock positively with the sections of the mold-body and hold the latter and base in proper position when forming the articles by the application of force to expanding plungers. The component parts of the mold-body are formed in their lower faces with depressions 7, which unitedly form a seat to receive the respective bosses or projections 5 and 6. The bosses may serve as a portion of the molding-surface of the cavity in which the material is shaped and formed under pressure. This is plainly shown at the right-hand side of Fig. 2, in which the top side of the boss is illustrated as constituting the bottom of the mold-cavity.

The mold sections or parts are hollow, the spaces opening through the bottom sides of the sections and being closed by means of the base-plate 1. Openings 8 are formed in the end walls of the mold-sections in coincident relation, whereby the spaces or chambers intercommunicate, so as to establish and maintain a circulation of hot air or flame through the entire body of the mold when the latter is in active operation, thereby preventing chilling of the glass or other material to be shaped. The mold-sections are connected by hinge-joints in the usual way and are united by miter-joints, whereby the sections are enabled to readily open and close. Handles 9 and 10 are applied to adjacent sections of the mold-body and are grasped when it is required to open or close the mold. The separable or parting sections are connected and forcibly brought together by means of a pin 11, which passes through registering openings formed in the lugs 12, projecting from the terminals of said sections, said pin having an eccentric or cam portion 13, which engages with the medial lug, so as to draw the sections close together upon turning the pin after being placed in position. A handle 14 is fitted to one end of the pin for convenience of operation when removing and placing the pin in position and turning it in the lugs to effect a drawing of the mold-sections together. Burners 15 are fitted to the side pieces or sections of the mold-body and are connected by flexible tubing with a suitable source of gas-supply, and these burners are provided with valves 16, by means of which the flow of gas to the burners may be regulated or entirely cut off.

The mold is provided with a series of cavities corresponding in shape to the configuration of the article to be formed. A rabbet or seat 17 surrounds the upper portion of each mold-cavity and is adapted to receive a pendent flange or rim 18 of the combined guide and cap plate 19. The lower edge of the rim or flange 18 overhangs the mold-cavity and constitutes, in effect, the top wall thereof. This cap-plate is provided with oppositely-disposed handles 20, by means of which it is placed in position or removed from the mold, as required. Openings 21 are formed in the cap-plate in line with the mold-cavities and are adapted to receive the plungers 22 and direct them in their vertical movements and more particularly when advanced to expand the glass or plastic material placed in the mold-cavity and from which the article to be shaped is formed. The walls of the openings 21 are of sufficient extent to insure centering and maintaining the plungers in proper position during their forward movement when in active operation. These walls are reduced intermediate of their upper and lower ends to form spaces 23, surrounding the plungers, thereby reducing the extent of frictional surface between the parts. The size and shape of the openings 21 will depend upon the extent and form of the receiving ends of the mold-cavities, as will be readily understood.

The plunger-head 24 has its lower end reduced, as shown at 25, and the shoulders formed at the base of the reduced end 25 incline oppositely from a central point to admit of the cross-head 26 having a limited rocking movement. The plunger-head 24 is adapted to have the force applied expanded for advancing the plungers, so as to compress and cause the plastic material to fill every portion of the mold-cavities.

The cross-head 26 is formed upon its top side with parallel ears 27, between which is received the reduced end 25 of the plunger-head, a transverse pivot-fastening 28 connecting the plunger-head and cross-head by being passed through registering openings formed in the parts 25 and 27. The upper edges of the ears 27 are straight and come opposite the shoulders 29, formed at the base of the reduced end 25 and oppositely inclined, as set forth. The lower end of the reduced part 25 is curved longitudinally, so as to admit of the cross-head rocking upon the pivot-fastening 28. The plungers 22 are loosely connected with the terminal portions of the cross-head 26 by means of fastenings 30, which are headed at their upper ends and have their lower ends threaded and fitted into openings formed centrally of the plungers. The openings in the ends of the cross-head are sufficiently large to admit of the plungers having a movement in every direction to adapt themselves to the guide-openings of the cap-plate 19 and to variations in the quantity of material placed in the mold-cavities. As shown, the plungers slope from a central point downwardly toward their sides, whereby provision is had for the relative movement between the plungers and cross-head. A fulcrum-pin 31 is located centrally of the cap-plate 19 and projects vertically therefrom, and its upper end is made tapering and enters a depression or cavity formed centrally in the lower face of the cross-head 26. Inasmuch as the force applied to the plunger-head is transmitted to the plungers through the cross-head 26 and fulcrum-pin 31, it is obvious that the said cross-head is adapted to turn or rock upon the fulcrum-pin, thereby equalizing the pressure applied to the plungers for forcing the material to all parts of the mold-cavities and resulting in subjecting said material in the mold-cavities to a like degree of pressure, whereby perfect articles are formed.

The mold herein described is of the open-and-shut type, and the articles formed are provided with fins upon their outer surface corresponding to the joints between the several sections of the mold. In the form of mold shown in Fig. 7 the sectional body forms the feet, knobs, or other projecting parts of the articles, the body portion of said articles being formed in the block 32, which is removably fitted in a seat formed in the top side of the mold-body when the sections are united. A cap-plate 33 is in turn fitted within a seat formed in the upper side of the block and corresponds to the guide or cap plate 19 and is provided with openings through which the plungers work. The articles shaped in this form of mold are seamless, with the exception of the head and feet, which latter, being formed in the sectional body of the mold, have seams corresponding with the joints between the several sections. In all other essential particulars the block is substantially the same as the open-and-shut mold and is heated and operated in the same manner.

The fulcrum-pin 31, in addition to the function of forming a support for the cross-head 26 to tilt upon, also centralizes the parts 26 and 19, whereby the plungers 22 are properly positioned when applying pressure thereto.

When the mold is used for pressing pottery-ware, the heat resulting from the circulation of flame, hot air, or other medium dispels all moisture and prevents sweating and a sticking of the ware in the mold when formed.

Having thus described the invention, what is claimed as new is—

1. A mold having a plurality of mold-cavities, a vertically-disposed fulcrum-pin located about medially of the mold-cavities, a cross-head mounted upon the upper end of the fulcrum-pin to tilt in any direction, plungers loosely connected with the cross-head and adapted to coöperate with the mold-cavities, and means for applying pressure to the cross-head in vertical line with the fulcrum-pin, substantially as set forth.

2. In combination with a mold having mold-cavities, a cross-head mounted to rock, plungers located upon opposite sides of the fulcrum of the said cross-head and having their top sides sloping from a central point in all directions, and a vertical pivotal connection between the cross-head and plungers, substantially as set forth.

3. In combination with a mold having mold-cavities, and a cap-plate applied to the top side of the mold and formed with guide-openings, plungers adapted to work through the guide-openings of the cap-plate, a cross-head carrying the plungers and mounted upon a fulcrum-pin applied to the cap-plate, and a plunger-head pivotally connected with the cross-head, substantially as set forth.

4. In combination, a mold having mold-cavities, a cross-head bearing plungers and mounted to rock, and having spaced ears upon its top side, and a plunger-head having its lower portion reduced and pivotally connected between the said spaced ears and having the shoulders formed at the base of the reduced portion oppositely inclined, substantially as described.

In testimony whereof I affix my signature in presence of two witnesses.

ALBERT R. GROTZ. [L. S.]

Witnesses:
FRED HELLERY,
JAMES WATERS.